United States Patent [19]

Wilson

[11] 4,357,381
[45] Nov. 2, 1982

[54] THERMOPLASTIC BUILDING ENCLOSURE MEMBER

[76] Inventor: Ted R. Wilson, 5009 Grand Ave., Kansas City, Mo. 64112

[21] Appl. No.: 208,994

[22] Filed: Nov. 20, 1980

[51] Int. Cl.³ .................... B29C 3/00; B29C 25/00
[52] U.S. Cl. ........................... 428/174; 52/80; 52/200; 264/292; 264/322; 264/327
[58] Field of Search ............ 428/174; 264/544, 574, 264/522, 292, 348, 291, 237, 288.4, 322, 327; 52/80, 200, 82

[56] References Cited

U.S. PATENT DOCUMENTS 2,791,801  5/1957  Szantay .................... 18/4
3,439,078  4/1969  Whiteford ................. 264/544
4,185,069  1/1980  Smith et al. ............... 264/292

Primary Examiner—Paul J. Thibodeau
Attorney, Agent, or Firm—Holman & Stern

[57] ABSTRACT

A process for forming a low silhouette thermoplastic enclosure panel including the steps of heating a thermoplastic sheet while its periphery is restrained and tension exerted outward toward the periphery thereof, uniformly cooling one side of said sheet while maintaining the opposite side at or above plastic deformation temperatures until the side being cooled is sufficiently rigid to maintain its shape, removing the sheet from the restraining means and uniformly cooling both surfaces of the sheet material to effect a deflection of the sheet in a direction of the first cooled surface.

8 Claims, 8 Drawing Figures

THERMOPLASTIC BUILDING ENCLOSURE MEMBER

BACKGROUND OF THE INVENTION (1) Field of the Invention

The present invention relates to organic synthetic thermoplastic building enclosure members and more particularly to skylights.

(2) Description of the Prior Art

Thermoplastic compounds have recently found widespread utilization as building materials. These compounds have inherent characteristics which make them translucent to light with good weatherability. However, when such compounds are utilized as enclosures for buildings, especially for a roofing or panel application, the structural characteristics of the compounds for enclosing large areas are such that additional framing members need be employed to prevent setting or collapse when subjected to unusual structural loads thereon.

One particular application where thermoplastic material is utilized in skylight construction and the like is in roofs of buildings. The use of thermoplastic material for skylights are disclosed in U.S. Pat. Nos. 2,610,593 and 2,790,400 to Wasserman and 3,434,250 to Kiekhaefer. These patents generally describe dome and dual dome shapes which have been limited to small and medium skylight openings since plastic domes cannot be made and handled efficiently in the larger sizes. Furthermore, from an aesthetic standpoint, the dome-shaped skylights generally break symmetrical lines. The current design trend is to a flat shape or low profile skylight which blends into the basic building design and maintains architectural integrity. Thermoplastics are desireable as safety glazing. Flat thermoplastics used overhead or vertically as transparent glazing or opaque decorative panels do not remain flat. As a consequence of temperature differentials from inside to outside, material fabricated originally as flat begins to bow inward due to the expansion of the inner surface with higher temperature and greater humidity absorption on the inside. Thermoplastics originally flat and after deflection due to temperature or humidity bowing and under live loads such as wind and snow develop into a structurally sound but aesthetically unattractive inwardly bowed concave form. Once bowed due to gradients, conventional flat glazing remains bowed in the same inward direction even though gradients may change with seasons. Stresses under live loads in this concave form are known as diaphragm stresses. These are generally not large and the resulting inwardly bowed concave form is able to support relatively large loads, much larger than conventional upward formed domes of equal thickness. This beneficial load bearing characteristic is also part of this invention since under large loads it develops into the inwardly bowed concave form. However, the new invention has neither the undesireable characteristic of temperature and humidity bowing nor the 5% to 10% rise required in conventional doming processes to produce a minimally useful rigid shape. Moreover, an important characteristic of the panels of this invention is that when the load is removed, the panels return smoothly without "oil-canning" or sharp rebounding to their original modified flat form, having a slight upward bow. By contrast, conventional flat panels retain a slight inward bow due to temperature and humidity gradients. This can result in an undesireable and unattractive sagging appearance, with a further resultant tendency to collect water and dirt in the inwardly concave bow.

Additionally, conventional domes of greater thickness fracture upon buckling under load, since the curvature reversing process produces destructively high tensile stresses at the perimeter of the dome. The present commercially available low profile (flat) products are manufactured using a free blown process which applies air pressure to the bottom side of a formed thermoplastic sheet in a hot plastic state, or by molding the hot sheet by molding with a shaped bottom plug, to effect a deflection of 5% to 10% of the short dimension in the final product. Forming to only 5% to 10% is a compromise on engineering to obtain better aesthetics. The dome rise which produces optimum strength is 25% of the shorter base dimension. This is documented in publications of the Rohm & Haas Company, 1971.

By contrast, a thermoplastic skylight, or the like, produced according to this invention overcomes these difficulties of the prior art low profile constructions by providing not only an improved member which resists loads and bowing due to temperature and humidity gradients but provides extra rigidity with the lowest possible silhouette (curvature ranging from 0.5% to 2.0% of the short dimension) but, also, has a spring-back property not found in current structures. That is, the building enclosure member constructed in accordance with the present invention, withstands more substantial loads than currently available enclosure members and if subjected to unusual deforming loads will spring-back to its original shape and condition.

SUMMARY OF THE INVENTION

This invention concerns a process of manufacture, products of this process, and apparatus utilized therein for producing a thermoplastic building enclosure member having a low, generally flat, profile with improved physical properties and particularly to molding the thermoplastic material in a novel manner by the use of differential cooling means. The apparatus of this invention is a conventional plug and ring molding apparatus with the improvements of providing the top of the clamping ring box member with a plurality of openings or louvres to permit directing air to the top of the thermoplastic sheet during processing using any conventional air mover.

The process of forming a thermoplastic building enclosure member according to this invention, comprises the steps of heating a sheet-like body of an organic synthetic thermoplastic material to the point at which the sheet is plastically deformable but still structurally integral, clamping the edges of the material around, stretching the material by applying pressure using the plug perimeter only applied to the bottom side of the material, cooling the top side of the material in its stretched condition to effect a temperature differential between each side, removing the formed material when the top surface is rigid and further cooling at ambient temperatures to develop the desired upward deflection of the material, after the sheet is removed from the forming apparatus. The plug is preferably constructed of a solid insulating material with a raised perimeter. The insulation prevents the bottom side of the sheet from cooling before the top side. The raised perimeter prevents marring of the smooth bottom surface.

This unobvious and deflection characteristic of the forward thermoplastic sheet was discovered by pure surrendipity in an attempt to speed the cooling process the outer surface was cooled by a fan. Upon removing the workpiece from the apparatus, the deflection of the side upon which the fan was impinged, the observation of the workpiece determined its utility.

It is the general object of the present invention to avoid and overcome the foregoing and other difficulties of and objections to prior art practices by the provision of an improved, simplified method for forming stretched thermoplastic material which is of the shape to which the piece is to be molded, the process involving differential cooling of the stretched thermoplastic material itself so as to promote spring-back and resistance to temperature and humidity bowing.

Another object of the invention is to provide an improved method for shaping stretched thermoplastic material by differential cooling applied to the thermoplastic material to effect controlled contouring of the thermoplastic. Yet another object of this invention is to provide a method of forming stretched thermoplastic by differential cooling applied to opposite sides thereof, the process includes the step of maintaining the bottom side of the material still in a warm plastic state and in a stressed condition while cooling is applied to the top side of the stretched thermoplastic.

Yet another object is to provide building enclosure panels suitable for skylights, solar collector covers, and the like, which resist loads and temperature and humidity gradient bowing, while providing extra rigidity with the lowest possible silhouette.

Still a further object of this invention is to provide thermoplastic components for skylights, and the like, which have a low profile, good weatherability, no distortion when viewed normal to the surface, and good spring-back upon being subjected to deformation loads.

DESCRIPTION OF THE PREFERRED EMBODIMENTS

Figure 1:
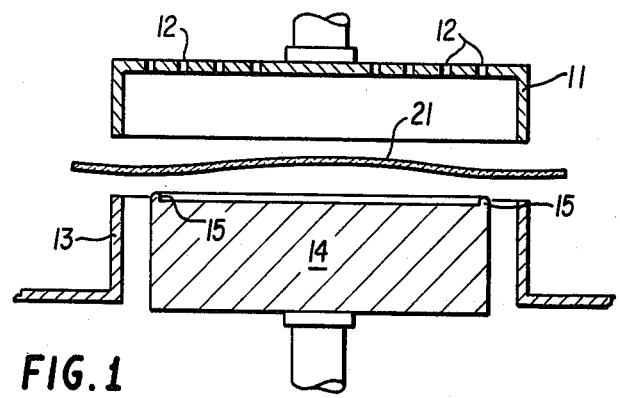
FIG. 1 is a cross-sectional side view of a ring and plug apparatus of this invention showing a preheated thermoplastic sheet-like material in position in the apparatus.
Figure 2:
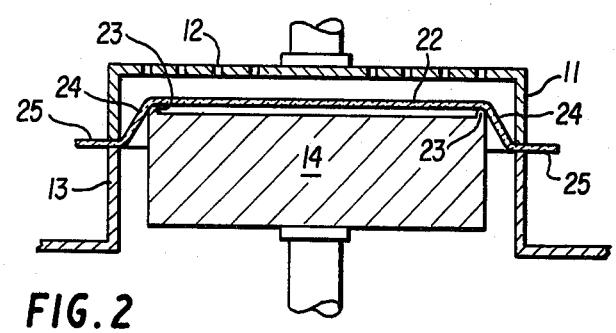
FIG. 2 is a cross-sectional view showing the thermoplastic material subjected to clamping pressure and stretched by the plug.
Figure 3:
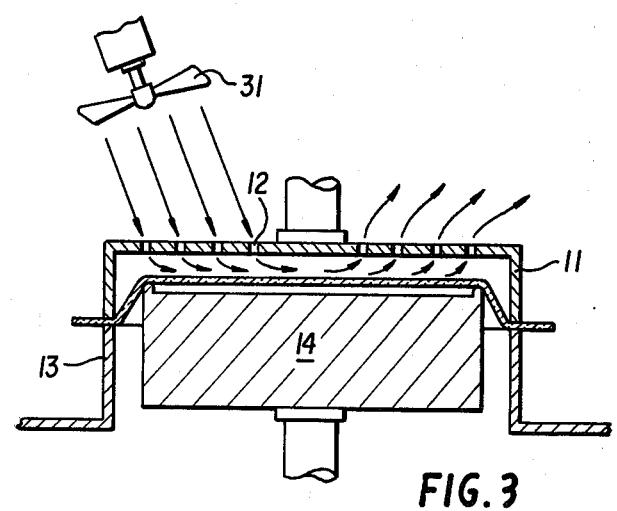
FIG. 3 is a cross-sectional view showing one means of providing a blanket of cooling air to the top side of the stretched material.

Referring to the drawing, there is shown an apparatus of this invention for molding preheated thermoplastic sheets to provide a building enclosure member having enhanced physical properties. In operation of the apparatus of the drawing, a thermoplastic sheet material is generally subjected to heating over the entire area thereof in order to obtain adequate and uniform plasticity for the particular type of plastic being processed. Preferably, the sheet of thermoplastic is heated in a suitable oven at a temperature and for a time duration so as to soften the material, permitting the material to stretch or elongate when subjected to tensile stresses as is well known in the thermoplastic art. Referring to FIG. 1, the hot sheet 21 is then horizontally placed on a flange ring 13 and a flat planar surface such as provided by the top of plug 14. Clamping pressure applied to each side of the sheet by clamp ring 11 and flange ring 13 secures the sheet. Sufficient pressure is applied to prevent the sheet from shifting during processing but not enough pressure to cause detents in the sheet. The sheet is then secured around its perimeter. Referring to FIG. 2, plug 14 is activated and plug pressure is applied at the perimeter of the plug 14 at contact points 23 of the thermoplastic sheet. The plug pressure elongates or stretches the sheet to form curb 24 and flange 25. The amount of pressure applied determines the height of the curb and the tension across the length L and width W of the sheets. The height of the curb H may vary from $\frac{1}{2}$ inch to 4 inches, preferably between 1 and 2 inches, and is most preferably about $1\frac{1}{2}$ inches. The difference in the curb height has a negligible effect in the characteristics of the material constructed in accordance with the present invention. The top surface 22 of the thermoplastic sheet is cooled by cooling means while still subjected to tension from the plug pressure. In FIG. 3 fan 31 provides a blanket of circulating cooling air through holes 12 located in the top of the clamping ring box. Any low pressure cooling means sufficient to provide a thermal gradient between the top and the bottom of the sheet adequate to cool the top surface sufficiently to make it rigid, while the bottom surface remains thermoplastic would be suitable.

Figure 4:
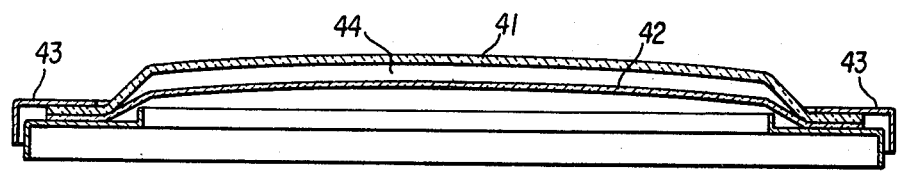
FIG. 4 is a cross-sectional view of a two-panel skylight according to one embodiment of this invention.
Figure 5:
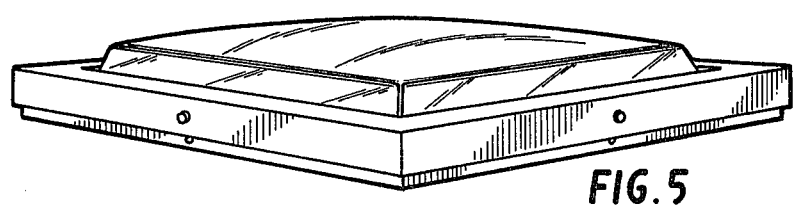
FIG. 5 is a perspective view of a skylight according to this invention.
Figure 6:
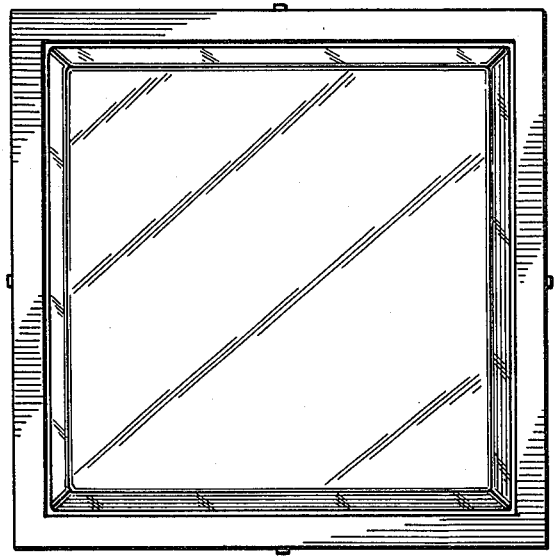
FIG. 6 is a top plan view of a skylight according to this invention.
Figure 7:
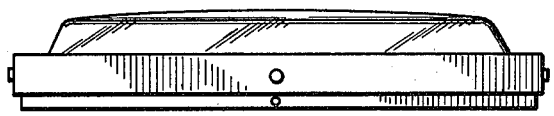
FIG. 7 is a side elevational view of a skylight showing the slight bow, according to this invention.
Figure 8:
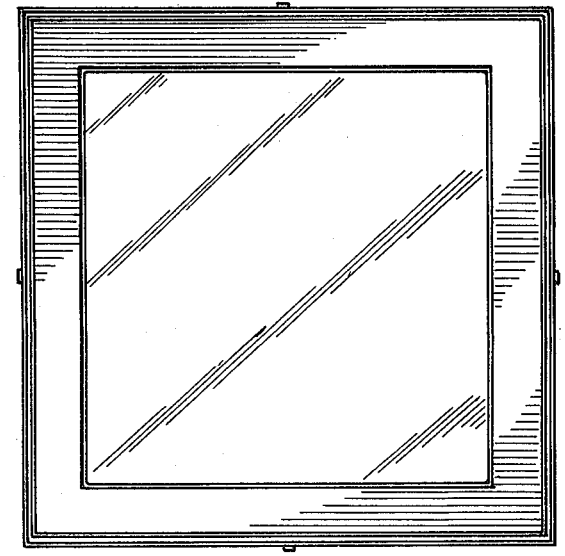
FIG. 8 is a bottom plan view of a skylight according to this invention.

FIG. 4 shows a cross-sectional view of a double panel skylight wherein the outer panel 41 and the inner panel 42 are both in accordance with this invention. The panels enclose an insulating air space 44 and are held together by a conventional frame 43. In FIG. 5, the bow of the generally flat panels have purposely been exaggerated to emphasize the bow, which should not exceed the rise indicated elsewhere in this Specification. Typically, panel 41 may be $\frac{1}{4}$ inch thick and panel 42 may be $\frac{1}{8}$ inch thick. Panel 41 may be tinted, whereas panel 42 is preferably clear.

The thermoplastic material is a good insulator against heat transfer and allows this differential in temperature between the sheet surfaces to be maintained. Cooling is continued until the top surface becomes rigid, the clamp pressure and plug pressure are then released and the panel removed from the apparatus. Upon removal, the top surface of the panel is flat but upon further cooling to room temperature, a slight upward deflection develops.

Exemplary of the synthetic organic thermoplastic polymers suitable for use in this invention are any thermoplastic materials which form fusible and rigid objects and which have not been previously orientated whether by annelaing or stretching.

Suitable polymers include Uvex brand of thermoplastic from Eastman Chemical Company, polycarbonate, polyvinyl chloride, polystyrene, cellulose acetate-butyrate copolymer, ABS polymers, -olefinic polymers. Preferably polymers of acrylic and methacrylic esters and acids are employed. Polymethylmethacrylate is most preferred.

Sheet thickness of the thermoplastic polymer useful in the process according to this invention can range from ⅛ inch to ½ inch, preferably from ¼ inch to ⅜ inch and especially ¼ inch.

In a preferred embodiment, the enclosure panel of the present invention is molded from ¼ inch sheet of cell cast polymethylmethacrylate. The sheet is heated in an oven at temperatures between 325° and 350° F. and horizontally placed into an apparatus as described above. Clamp pressure is uniformly to back sides of the sheet near its perimeter and plug pressure sufficient to cause a curb height of 1½ inches to 2 inches and to provide tension across the entire surface area of the sheet, directed outward from the center towards the perimeter. Cooling of the top surface of the sheet to about 288° F. or less is accomplished by fan circulation of ambient air. At this temperature, the top surface becomes rigid and the formed workpiece removed from the apparatus. The workpiece or panel is then stored at room temperature, and upon further cooling, and after removal from the form, develops a slight upward deflection. The deflection is only about 0.5% to 3.0% of the short dimension of the sheet. This panel will support large useful loads as described above and will resist both chemical and structural deterioration from weather for the useful life of most structures. The enclosure panel will also have good rebounding or spring-back characteristics. For example, if the panel is subjected to deforming pressures on the top surface, upon release of these pressures, the surface will spring back to its original condition. The enclosure panel thus produced is a superior skylight component.

For skylight construction, the panel manufactured according to this invention is secured by a suitable frame having an integral condensate gutter, exerior drip and sufficient drainage slots to carry moisture to the outside. Preferably, the skylight construction involves double or triples layers using a tinted outer layer and a clear inner layer or layers. This combination provides good see-through visibility both day and night without excessive heat gain daytime, heat loss at night, or sun glare.

Additional applications of the panels according to this invention include, but are not limited to, side and roof and floor panels in land sea, or air vehicles, cover and bottom panels for solar collectors, sign faces, decorative interior display panels, facia panels, and the like. These panels may be single or multiple layered.

The thermoplastic outer panel may be transparent, tinted, colored, mirrored or opaque, and may be smooth or pebbled. Pebbled panels may be produced by cooling the top surface with a fine or course cool liquid which is non-reactive with the plastic, preferably water.

What I claim is:

1. A process of forming a low silhouette thermoplastic enclosure panel comprising the steps of heating a sheet-like thermoplastic workpiece to effect plastic deformation;

restraining the periphery of the workpiece in a desired plane while exerting tension on the workpiece outward toward the periphery so as to form a contact-free plane in the workpiece center;

uniformly cooling one side of said workpiece while maintaining the opposite side at or above the plastic deformation temperatures until the side being cooled becomes sufficiently rigid to maintain said workpiece shape in the desired plane;

removing said workpiece; and uniformly cooling both surfaces of said workpiece to effect a deflection of 0.5 to 3 percent of the shortest dimension of the panel in the direction of the first cooled surface.

2. A process of forming a low silhouette thermoplastic enclosure panel comprising the steps of heating a sheet-like thermoplastic workpiece to effect plastic deformation;

restraining the periphery of the workpiece in a desired plane;

inserting and moving a plug to engage one side of said workpiece only along the plug's periphery so as to exert tension on the workpiece outward toward the periphery, to cause a contact-free portion of said workpiece, restricted by the perimeter of said plug to be displaced into a plane parallel to the retraining edges;

uniformly cooling one side of said workpiece while maintaining the opposite side at or above the plastic deformation temperatures until the side being cooled becomes sufficiently rigid to maintain said workpiece shape in the desired plane;

removing said workpiece; and uniformly cooling both surfaces of said workpiece to effect a deflection of 0.5 to 3 percent of the shortest dimension of the panel in the direction of the first cooled surface.

3. The process according to claim 2 wherein said plug is in the shape of the formed workpiece.

4. The process according to claim 2 wherein the top surface of said plug is covered by heat insulating material.

5. The product produced according to claim 1.

6. The product produced according to claim 2.

7. A rigid synthetic organic thermoplastic enclosure panel produced according to claim 1 or 2 having a curvature of 0.5 to 3 percent of the shortest dimension and characterized by the ability to return to its original condition after being subjected to deforming load.

8. The building enclosure according to claim 7 useful as a skylight component.

* * * * *